Dec. 17, 1946.  L. A. DUNAJEFF  2,412,676
SYNCHRONIZED MOTOR CONTROL
Filed Dec. 16, 1944   2 Sheets-Sheet 1
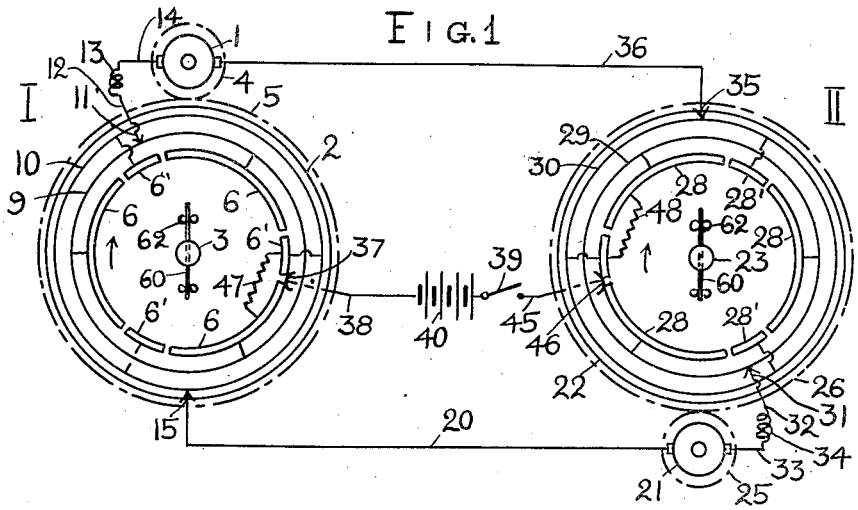
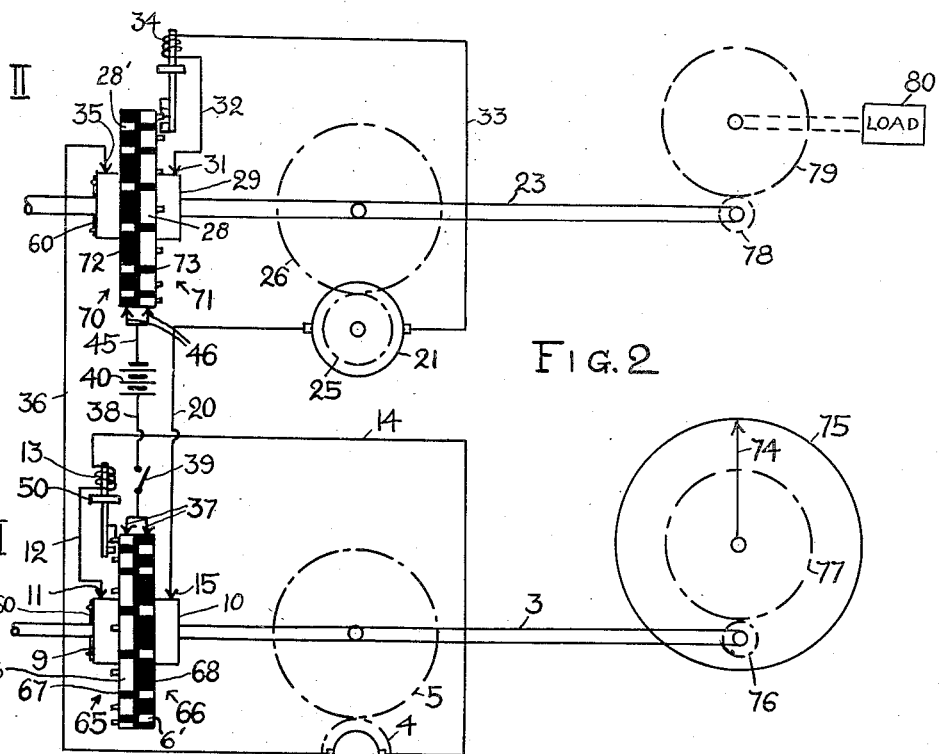
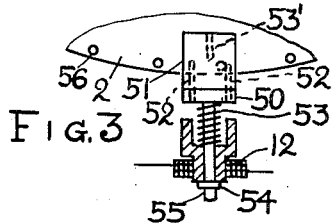
LEONID A. DUNAJEFF
INVENTOR.
BY  John P. Mironov
ATTORNEY Dec. 17, 1946.  L. A. DUNAJEFF  2,412,676
SYNCHRONIZED MOTOR CONTROL
Filed Dec. 16, 1944  2 Sheets—Sheet 2
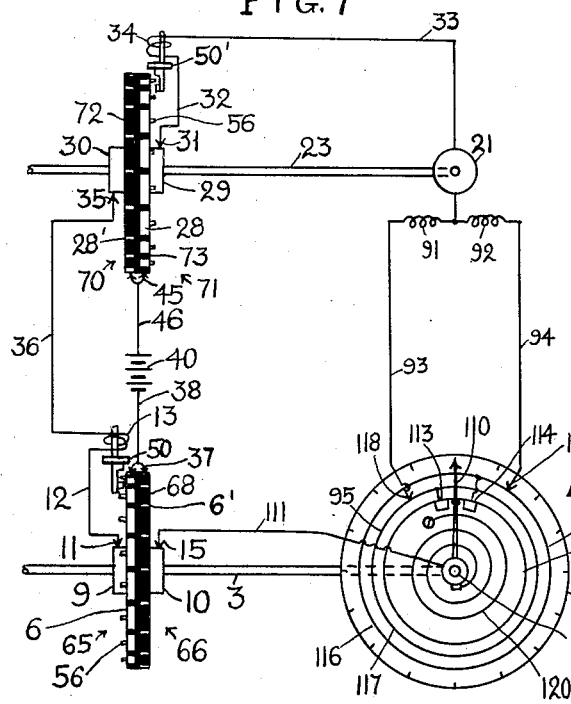
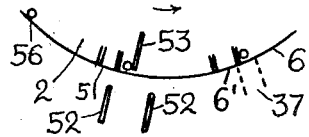
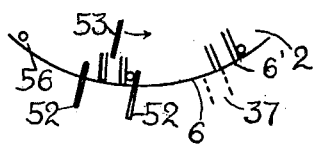
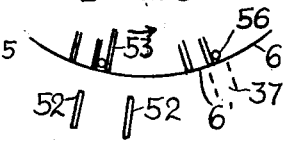
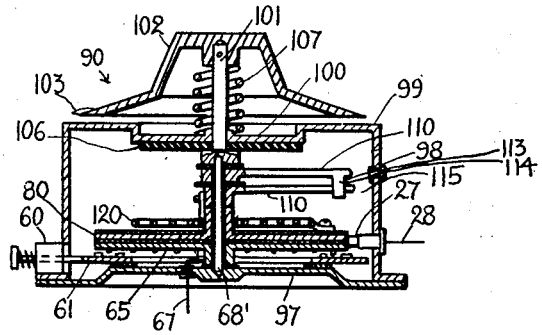
*Leonid A. Dunajeff*
INVENTOR.
BY John P. Nikonow
ATTORNEY Patented Dec. 17, 1946

2,412,676

UNITED STATES PATENT OFFICE 2,412,676

SYNCHRONIZED MOTOR CONTROL

Leonid A. Dunajeff, Havre de Grace, Md.

Application December 16, 1944, Serial No. 568,479

14 Claims. (Cl. 172—293)

My invention relates to means and methods for synchronizing rotation of two bodies such as shafts or motors and has particular reference to placing a remotely located working shaft in any desired position or to keep it in continuous motion synchronously with a piloting shaft.

My invention has for its object to provide an electrical connection between a shaft connected to a useful load and a controlling shaft in such a manner that any motion of one of these shafts is repeated by the other shaft in successive steps, so that the load shaft will follow the movements of the piloting shaft.

Alternating motions of both shafts are regulated by two rotary switches of special design, which reciprocally provide electrical connections at both sides, making all motions depending on each other.

The similar motions of both shafts can be performed in both directions automatically or the piloting shaft can be operated manually, the working shaft following up automatically every step of the manual movement, starting and stopping every time when the piloting shaft is started or stopped.

With my invention it is possible to provide synchronization for shafts driven by electrical motors of different power, as between the load shaft driven by a large power motor, the piloting shaft being driven by a small motor capable only to move indicating devices.

My invention is more fully explained in the accompanying specification and illustrations in which:

Fig. 1 is a diagrammatic view of my control system with two synchronized motors

Fig. 2 is a modification of the same in which an additional escapement synchronizing arrangement is provided;

Fig. 3 is a fractional view of an escapement device;

Figs. 4, 5, and 6 are diagrammatic views of the successive relative positions of the contact segments and escapement device;

Fig. 7 is a modified view of a system with a manual control;

Fig. 8 is a sectional detail view of a manual control device.

As is shown in Figs. 1 and 2, the controlling system consists of a transmitter, generally designated as I, and a receiver, generally designated as II.

The transmitter comprises a pilot motor 1 and a rotary commutator 2 on a shaft 3. The commutator is operated by the motor through a pinion 4 and gear 5 or by other suitable transmission. The commutator comprises a plurality of segments 6, 6' separated by gaps. The segments are divided in two groups, segments 6 of one group alternating with the segments 6' of the other group, both groups being insulated from each other. The segments 6 of one group are electrically connected together by a collector ring 9, and the segments of the other group are connected together by a collector ring 10. The ring 10 is engaged by a contact brush 11 connected by a lead 12, magnet 9, coil 13, and lead 14 to one terminal of the motor 1, and the ring 10 is engaged by a brush 15 connected by a lead 20 to one terminal of the second motor 21.

The receiver II is similar to the transmitter and consists of a rotary commutator 22 on a shaft 23, rotated by the second motor 21 through a pinion 25 and gear 26. The second commutator has two groups of segments, 28, 28' connected respectively to collector rings 29, 30. The ring 29 is engaged by a brush 31, connected by leads 32, 33 and coil 34 to the motor 21. The ring 30 is engaged by a brush 35 connected by a lead 36 to the motor 1. The segments 6, 6' are engaged by a brush 37, connected by a lead 38, through a switch 39 to one terminal of a source of electric current 40, the other terminal being connected by a lead 45 to a brush 46, engaging segments 28, 28'. The motors are therefore alternately energized when the brushes 37 and 46 pass from one segment to another.

Resistors 47 and 48 may be provided between the groups of the segments 6, 6' and 28, 28', so that both the motors will run all the time, but at alternately fluctuating speeds, slow speed through the resistors and high speed when the resistors are short circuited.

To avoid any errors in my synchronizing method, and to eliminate any inertia effect, thereby assuring a high degree of accuracy, I employ an escapement mechanism for positively stopping the motors at the moments of the current interruption.

As shown in Fig. 3, the magnet coil 13 included in the circuit between the leads 12 and 14, attracts an armature 50 when energized. The armature carries a plate 51 with teeth 52 at one end and a tooth 52 at the other end. A spring 53 urges the plate outwards, the movement being limited by a collar 54 on a shaft 55 of the armature. In this position of the plate 51, one of the teeth 52 engages one of the pins 56 extending from the side of the commutator 2. When the plate is attracted by the magnet the tooth 53' engages one of the pins 56. The pins are spaced according to the spacing of the large segments 6 and 28.

To enable the shafts 3, 23 to rotate continuously while the commutators are being started and stopped by the teeth 52, 53, the commutators are mounted loosely on the shafts and are coupled by resilient spring bars 60. Each bar 60 passes through a hole in the corresponding shaft and is engaged by pin 62, extending from the body of the corresponding commutator. The shaft 3 or 23 therefore, can continue its rotation while the corresponding commutator is held by one of the teeth 52, 53'. Every time the plate 51 is moved by the spring 53, the commutator is moved forward by the corresponding spring bar 60 and moved back again by the motor when the latter is energized. When the operation is properly adjusted, the shafts will rotate substantially continuously in a perfect synchronism, developing full torque, while the commutators will intermittently start and stop.

The operation of the device can be better understood from the diagrammatic view of Fig. 1 and Figs. 4, 5 and 6. In the position of the commutators as shown in Fig. 1, the commutator 2 has just arrived in the position in which the brush 37 bridges the gap between the segments 6 and 6', the coresponding spring 60 being deflected by the motor torque and resistance of the pin 56 as shown in Fig. 4.

The magnet coil 13 was energized together with the motor 1 during this movement, holding the armature 50 attracted so that the teeth 52, 53' held positions as shown in Fig. 4. The movement continued until the nearest pin 56 engaged the tooth 53'. The spring 60 was then deflected by the torque of the motor which continued its rotation. The motor 1 was energized during its rotation from the source of curent 40 through the lead 38, brush 37, segment 6, ring 9, brush 11, lead 12, coil 13, lead 14, motor 1, lead 36, brush 35, ring 30, segment 28', brush 46, lead 45, switch 39 and back to the source of current 40.

At the moment when the brush 37 engaged also the segment 6', as shown in Fig. 1, the motor 21 became also energized from the source of current 40 through the lead 38, brush 37, segment 6', ring 10, brush 15, lead 20, motor 21, lead 33, coil 34, lead 32, brush 31, ring 29, segment 28, brush 46, lead 45, and switch 39 to the source of current 40. The corresponding magnet coil 34 is then also energized and attracts the plate 51, releasing the pin 53 from the tooth 53' and advancing the teeth 53', allowing the commutator 22 to rotate until the next pin 56 engages the left tooth 52. As soon as the short segment 28' leaves the brush 46, however, circuit of the motor 1 becomes broken and the motor 1 stops. The coil 12 being now deenergized, the plate 51 is released, the teeth assuming positions shown in Fig. 5. The spring 60 causes the commutator 2 to rotate on the shaft 3 until the next pin 56 is stopped by the tooth 52 as shown in Fig. 5 and the brush 37 being then in a position shown in Fig. 5.

The motor 21 will continue its rotation until the next pin 56 is engaged by the left tooth 52 as was mentioned before.

The alternating intermittent rotation of the two commutators and the substantialy continuous rotation of the shafts will be stopped when one of the shafts is stopped or when the circuit is disconnected.

The distance between the inner ends of the teeth 52 is made sufficiently small to prevent the possibility of any of the pins passing between the inner tips of the teeth while the plate 51 is moved in one or the other direction. The magnets, therefore, will positively control the rotation of the motors by definite steps so that motor 21, regardless of its inherent speed characteristics or variations in speed due to variations in load etc. will rotate in a perfect synchronism with the motor 1 and will be instantly stopped when the motor 1 stops.

Observing the wiring shown in Fig. 1, it can be seen that the motors, commutators and magnets at both sides are operating in exactly the same manner, also that the timing is reciprocal, i. e., when the motor of one side stops, the other motor rotates.

In view of the fact that the alternate segments are connected together, each commutator can be conveniently made of two discs as shown in Fig. 2. The first commutator comprises discs 65, 66 insulated from each other and from the shaft 3. The discs have hubs 9, 10, respectively, serving as collector rings for the brushes 11, 15. Disc 65 is provided with long segments or teeth 6, disc 66 having short segments or teeth 6', the teeth being separated by insulation segments 67, 68 respectively. The alternate metal segments of one disc are equal in length to the insulated segments of the other disc so that the brush 37, which is wide enough (or has two contact points) to engage both discs, passing from one segment to the next without breaking the circuit. The second commutator 22 is made in a similar manner and consists of two discs 70, 71 with insulated segments 72, 73 between the teeth 28, 28'.

The position of the shaft 3 may be indicated by the pointer 74 on a scale 75, the pointer being connected to a shaft 3 by gears 76, 77. Similar gears 78, 79 may be provided to connect the shaft 23 with a useful load 80. The pointer 74 will then indicate the exact position of the load.

My control system can be also applied to a manual control of a distant motor as shown in Fig. 7. The motor 21 is provided with two reversing windings 91, 92, connected by leads 93, 94 to collector rings 95, 96 respectively of a manual control device 90. The latter is shown more in detail in Fig. 6 and consists of a base 97 supporting a casing 98 having an upper wall 99 with a bearing 100 for a shaft 101. A knob 102 is secured to the upper end of the shaft 101 for manual rotation of the shaft. The knob is provided with a mark or pointer 103 for indicating its position on a scale 104 (Fig. 7) on the top of the casing. The lower end of the shaft has an enlarged portion 105, supporting a friction brake disc 106. A spring 107 is placed between the top 99 of the casing and the knob 102 for urging the shaft upwards thereby pressing the brake disc 106 towards the wall 99. The brake is released by manually depressing the knob 102 when it is desired to rotate the knob. The shaft 101 carries a contact arm 110' having contact points 113, 114 connected by leads 93, 94 (Fig. 5) to motor windings 91, 92. The arm 110' is insulated from the knob 102. The contact points straddle a contact arm 110, rotatively mounted on the shaft 68' and insulated therefrom. The arm is electrically connected to the hub 81 of the disc 80. A clock spring 120 is connected at one end to the disc 80, the other end of the spring being connected to the member 110.

For causing the motor 21 to move, the knob 102 is turned to the right or to the left in a desired position as indicated on the scale 104, by depressing the knob to release the brake 106. The brake locks the shaft 101 as soon as the pressure on the knob 102 is released, leaving the knob with the contact arms 110 and 110' in a desired position. The pressure of the spring will cause the corresponding contact point 113 or 114 to engage the contact arm 110, energizing the motor 1 through one or the other of the windings 91 or 92. If, for instance, the contact point 114 is engaged (Fig. 7), current will flow from the source of current 40 through the lead 45, brush 46, segment 26, hub 29, brush 31, lead 32, coil 34, lead 33, motor 2, winding 92, lead 94, brush 119, ring 96, point 114, arm 110, lead 111, brush 15, hub 10, tooth 6', brush 37 and lead 38 back to the source of current 40. The motor 21 will rotate the shaft 23 with the discs 70, 71, while the magnet 50' is energized for a distance, corresponding to the distance between the two teeth 52 of the plate 51, thereby placing the brush 46 on a contact tooth 28' of the next disc 70. As a result, the magnet 13 will be energized, releasing the discs 65, 66 and the shaft 3 for rotation for a distance between two teeth of the plate 51 thereby advancing the member 115 in the direction of displacement of the arm 110. The magnet 34 will be then deenergized, allowing one more step of movement for the motor 15 under action of the spring 60. The rotation of the motor and the shafts 3, 23 will continue until the member 115 is aligned with the arm 110 thereby releasing the contact point 114 from the arm 110 and disconnecting the motor circuit.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A synchronized control apparatus comprising a motor at a controlled point adapted to operate a useful load; a pair of relatively rotatable commutating elements at the controlled point; means to effect a relative movement between the commutating elements by the motor; one element comprising a plurality of electrically conductive segments separated by gaps, the other element comprising a contact brush slidably engaging the segments, all odd numbered segments being electrically connected together, and all even numbered segments being electrically connected together; a second pair of relatively rotatable commutating elements at a control point; a rotary means to effect a relative movement between the elements of the second pair; one element of the second pair comprising a plurality of electrically conductive segments, the other element of the second pair comprising a brush slidably engaging the segments, all even numbered segments of the second pair being electrically connected together, all odd numbered segments being also electrically connected together; the two brushes being arranged to be connected to the opposite poles of a source of current; one terminal of the motor being arranged to be electrically connected with the odd numbered segments of one pair, the other motor terminal being arranged to be electrically connected with the odd numbered segments of the other pair, one terminal of the rotating means being arranged to be connected with the even segments of one pair, the other terminal of the moving means being arranged to be connected with the even segments of the other pair, the motor being thereby successively started and stopped in step by step movement to effect the relative movements of the elements of the first pair in synchronization with the movements of the elements of the second pair.

2. A synchronized control apparatus comprising a motor at a controlled point adapted to operate a useful load; a pair of rotatable commutating members at the controlled point; means to rotate one of the commutating members by the motor; one member comprising a plurality of electrically conductive elements separated by gaps, the other element comprising a contact brush slidably engaging the elements, all odd numbered elements being electrically connected together, all even numbered elements being also electrically connected together; a second pair of relatively rotatable communicating members at a control point; a rotary means to rotate one of the members of the second pair; one member of the second pair comprising a plurality of electrically conductive elements, the other member of the second pair comprising a brush slidably engaging the elements, all even numbered elements of the second pair being electrically connected together, all odd numbered elements being also electrically connected together; the two brushes being arranged to be connected to the opposite poles of a source of current; one terminal of the motor being arranged to be electrically connected with the odd numbered elements of one pair, the other motor terminal being arranged to be electrically connected with the odd numbered elements of the other pair, the rotating means being arranged to be connected with the even elements of one pair and with the even elements of the other pair, the motor being thereby successively moved step by step in synchronism with the movements of the movable member of the second pair; and means to positively stop the relative movements of the first pair at the end of each step.

3. A synchronized control apparatus comprising a motor at a controlled point adapted to operate a useful load; a pair of rotatable commutating members at the controlled point; means to rotate one of the commutating members by the motor; one member comprising a plurality of electrically conductive elements separated by gaps, the other element comprising a contact brush slidably engaging the elements, all odd numbered elements being electrically connected together, all even numbered elements being also electrically connected together; a second pair of relatively rotatable commutating members at a control point; a rotary means to rotate one of the members of the second pair; one member of the second pair comprising a plurality of electrically conductive elements, the other member of the second pair comprising a brush slidably engaging the elements, all even numbered elements of the second pair being electrically connected together, all odd numbered elements being also electrically connected together; the two brushes being arranged to be connected to the opposite poles of a source of current, one terminal of the motor being arranged to be electrically connected with the odd numbered elements of one pair, the other motor terminal being arranged to be electrically connected with the odd numbered elements of the other pair, the rotating means being arranged to be connected with the even elements of one pair and with the even elements of the other pair, the motor being thereby successively moved alternately with the starting and stopping of the moving means, the motor being thereby caused to rotate in synchronism with the rotation of the moving means.

4. A synchronized control apparatus comprising a motor at a controlled point adapted to operate a useful load; a pair of rotatable commutating members at the controlled point; means to rotate one of the commutating members by the motor; one member comprising a plurality of electrically conductive elements separated by gaps, the other element comprising a contact brush slidably engaging the elements, all odd numbered elements being electrically connected together, all even numbered elements being also electrically connected together; a second pair of relatively rotatable commutating members at a control point; a rotary means to rotate one of the members of the second pair; one member of the second pair comprising a plurality of electrically conductive elements, the other member of the second pair comprising a brush slidably engaging the elements, all even numbered elements of the second pair being electrically connected together, all odd numbered elements being also electrically connected together; the two brushes being arranged to be connected to the opposite poles of a source of current; one terminal of the motor being arranged to be electrically connected with the odd numbered element of one pair, the other motor terminal being arranged to be electrically connected with the odd numbered elements of the other pair, the rotating means being arranged to be connected with the even elements of one pair and with the even elements of the other pair, the motor being thereby successively moved alternately with the starting and stopping of the moving means, the motor being thereby caused to rotate in synchronism with the rotation of the moving means; and electromagnetic means periodically and momentarily to stop the motor in response to the motor being energized and deenergized and to release the motor for movement in steps between the stopping moments.

5. A synchronized control apparatus comprising a reversible motor at a controlled point adapted to operate a useful load; a pair of rotatable commutating members at the controlled point; means to rotate one of the commutating members by the motor; one member comprising a plurality of electrically conductive elements separated by gaps, the other element comprising a contact brush slidably engaging the elements, all odd numbered elements being electrically connected together, all even numbered elements being also electrically connected together; a second pair of relatively rotatable commutating members at a control point; a rotary means to rotate one of the members of the second pair; one member of the second pair comprising a plurality of electrically conductive elements, the other member of the second pair comprising a brush slidably engaging the elements, all even numbered elements of the second pair being electrically connected together, all odd numbered elements being also electrically connected together; the two brushes being arranged to be connected to the opposite poles of a source of current; one terminal of the motor being arranged to be electrically connected with the odd numbered elements of one pair, the other motor terminal being arranged to be electrically connected with the odd numbered elements of the other pair, the rotating means being arranged to be connected with the even elements of one pair, and with the even elements of the other pair, the motor being thereby successively moved step by step in synchronism with the movements of the movable member of the second pair; and means included in the moving means to control the direction of rotation of the motor and to stop the motor.

6. A synchronized control apparatus comprising a reversible motor at a controlled point adapted to operate a useful load; a pair of rotatable commutating members at the controlled point; means to rotate one of the commutating members by the motor; one member comprising a plurality of electrically conductive elements separated by gaps, the other element comprising a contact brush slidably engaging the elements, all odd numbered elements being electrically connected together, all even numbered elements being also electrically connected together; a second pair of relatively rotatable commutating members at a control point; a rotary means to rotate one of the members of the second pair; one member of the second pair comprising a plurality of electrically conductive elements, the other member of the second pair comprising a brush slidably engaging the elements, all even numbered elements of the second pair being electrically connected together, all odd numbered elements being also electrically connected together; the two brushes being arranged to be connected to the opposite poles of a source of current; one terminal of the motor being arranged to be electrically connected with the odd numbered elements of one pair, the other motor terminal being arranged to be electrically connected with the odd numbered elements of the other pair, the rotating means being arranged to be connected with the even elements of one pair, and with the even elements of the other pair, the motor being thereby successively moved step by step in synchronism with the movements of the moveable member of the second pair; a pair of control elements associated with the moving means, one control element comprising a pair of contact points separated by a gap, the other control element comprising a contact arm for alternately engaging the contact points, the moving means including a spring for urging the contact points to occupy a neutral position with the contact arm occupying the gap.

7. A synchronized control apparatus comprising a motor at a controlled point adapted to operate a useful load; a pair of rotatable commutating members at the controlled point; means to rotate one of the commutating members by the motor; one member comprising a plurality of electrically conductive elements separated by gaps, the other element comprising a contact brush slidably engaging the elements, all odd numbered elements being electrically connected together, all even numbered elements being also electrically connected together; a second pair of relatively rotatable commutating members at a control point; a rotary means to rotate one of the members of the second pair; one member of the second pair comprising a plurality of electrically conductive elements, the other member of the second pair comprising a brush slidably engaging the elements, all even numbered elements of the second pair being electrically connected together, all odd numbered elements being also electrically connected together; the two brushes being arranged to be connected to the opposite poles of a source of current; one terminal of the motor being arranged to be electrically connected with the odd numbered elements of one pair, the other motor terminal being arranged to be electrically connected with the odd numbered elements of the other pair, the rotating means being arranged to be connected with the even elements of one pair and with the even elements of the other pair, the moving means being thereby rendered operative in response to the brushes engaging the even numbered segments of both pairs until the rotatable element of the second pair is moved through a predetermined distance for causing the corresponding brush to engage the odd segment thereby causing the moving means to stop and energize the motor for causing the rotary element of the first pair to move through a predetermined distance until the corresponding brush engages the odd segment, the motor and the moving means being thereby periodically and alternately released for rotation in synchronism with each other.

8. A synchronized control apparatus comprising a motor at a controlled point adapted to operate a useful load; a pair of rotatable commutating members at the controlled point; means to rotate one of the commutating members by the motor; one member comprising a plurality of electrically conductive elements separated by gaps, the other element comprising a contact brush slidably engaging the elements, all odd numbered elements being electrically connected together, all even numbered elements being also electrically connected together; a second pair of relatively rotatable commutating members at a control point; a second motor at a control point; means to rotate one member of the second pair by the second motor, one member of the second pair comprising a plurality of electrically conductive elements, the other member of the second pair comprising a brush slidably engaging the elements, all even numbered elements at the second pair being electrically connected together, all odd numbered elements of th second pair being electrically connected together, the two brushes being arranged to be connected to a source of current, one motor being alternately connected in a circuit with the even and odd numbered elements of both pairs and the other motor is alternately connected with the odd and even numbered elements, the motor being thereby alternately energized for rotation in steps corresponding to the spacing of the elements and being thereby caused to rotate synchronously with each other.

9. A synchronized control apparatus comprising a motor at a controlled point adapted to operate a useful load; a pair of rotatable commutating members at the controlled point; means to rotate one of the commutating members by the motor; one member comprising a plurality of electrically conductive elements separated by gaps, the other element comprising a contact brush slidably engaging the element, all odd numbered elements being electrically connected together, all even numbered elements being also electrically connected together; a second pair of relatively rotatable commutating members at a control point; a second motor at a control point; means to rotate one member of a second pair by the second motor, one member of the second pair comprising a plurality of electrically conductive elements, the other member of the second pair comprising a brush slidably engaging the elements, all even numbered elements at the second pair being electrically connected together, all odd numbered elements of the second pair being electrically connected together, the two brushes being arranged to be connected to a source of current, one motor being alternately connected in a circuit with the even and odd numbered elements of both pairs and the other motor is alternately connected with the odd and even numbered elements, the motor being thereby alternately energized for rotation in steps corresponding to the spacing of the elements and being thereby caused to rotate synchronously with each other; magnets associated with the commutators; movable armatures operated by the magnets; detent means carried jointly by the armatures and by the commutators, the magnets being included in the respective motor circuits, the detent means being arranged to positively stop the rotation of each commutator member upon completion of the movement corresponding to the transition for the corresponding brush from one contact element to another.

10. A synchronized control apparatus comprising a motor at a controlled point adapted to operate a useful load; a pair of rotatable commutating members at the controlled point, means to rotate one of the commutating members by the motor; one member comprising a plurality of electrically conductive elements separated by gaps, the other element comprising a contact brush slidably engaging the elements, all odd numbered elements being electrically connected together, all even numbered elements being also electrically connected together; a second pair of relatively rotatable commutating members at a control point; a second motor at a control point; means to rotate one member of the second pair by the second motor; one member of the second pair comprising a plurality of electrically conductive elements, the other member of the second pair comprising a brush slidably engaging the elements, all even number elements of the second pair being electrically connected together, all odd numbered elements of the second pair being electrically connected together, the two brushes being arranged to be connected to a source of current, one motor being alternately connected in a circuit with the even and odd numbered elements of both pairs and the other motor is alternately connected with the odd and even numbered elements, the motor being thereby alternately energized for rotation in steps corresponding to the spacing of the elements, and being thereby caused to rotate synchronously with each other; magnets associated with the commutators; movable armatures operated by the magnets; detent means carried jointly by the armatures and by the commutators, the magnets being included in the respective motor circuits, the detent means being arranged to positively stop the rotation of each commutator member upon completion of a movement corresponding to the transition for the corresponding brush from one contact element to another; and resistors included between the odd and even numbered elements of each pair.

11. A synchronized control apparatus comprising a motor at a controlled point adapted to operate a useful load; a pair of rotatable commutating members at the controlled point; means to rotate one of the commutating members by the motor; one member comprising a plurality of electrically conductive elements separated by gaps, the other element comprising a contact brush slidably engaging the elements, all odd numbered elements being electrically connected together, all even numbered elements being also electrically connected together; a second pair of relatively rotatable commutating members at a control point; a second motor at a control point; means to rotate one member of the second pair by the second motor, one member of the second pair comprising a plurality of electrically conductive elements, the other member of the second pair comprising a brush slidably engaging the elements, all even numbered elements of the second pair being electrically connected together, all odd numbered elements of the second pair being electrically connected together, the two brushes being arranged to be connected to a source of current, one motor being alternately connected in the circuit with the even and odd numbered elements of both pairs and the other motor is alternately connected with the odd and even numbered elements, the motor being thereby alternately energized for rotation in steps corresponding to the spacing of the elements and being thereby caused to rotate synchronously with each other; magnets associated with the commutators; movable armatures operated by the magnets; detent means carried jointly by the armatures and by the commutators, the magnets being included in the respective motor circuits, the detent means being arranged to positively stop the rotation of each commutator member upon completion of a movement corresponding to the transition for the corresponding brush from one contact element to another, and yieldable connection between the motor and the rotary member of the first pair.

12. A synchronized control apparatus comprising a motor at a controlled point adapted to operate a useful load; a pair of rotatable commutating members at the controlled point; means to rotate one of the commutating members by the motor; one member comprising two discs insulated from each other; a plurality of contact elements extending from each disc to its periphery and separated at the periphery by gaps, the elements of one disc corresponding to the gaps of the other disc, the other member comprising a contact brush extending across the peripheral portions of both discs; a second motor at a control point; a second pair of relatively rotatable commutating members at a control point; means to rotate one of the members of the second pair by the second motor, one member of the second pair comprising two discs insulated from each other; a plurality of contact elements extending from each disc to its periphery and separated at their periphery by gaps, the elements of one disc corresponding to the gaps in the other disc; a second contact brush extending across the periphery of the two discs of the second pair, the brushes being arranged to be included in circuits with the motors and with a source of current; one disc of each pair having elements longer than the gaps, the adjacent disc of each pair having gaps larger than the elements, each motor being arranged to be periodically connected in a circuit with both brushes and with one large element of the first pair of the members and a small element of the second pair of the members; and alternately with the small element of the first pair of the members and with the large element of the second pair of the members, the motors being thereby rendered alternately energized and deenergized thereby maintaining a step by step synchronism of their rotation.

13. A synchronized control apparatus comprising a motor at a controlled point adapted to operate a useful load; a pair of rotatable commutating members at the controlled point; means to rotate one of the commutating members by the motor; one member comprising two discs insulated from each other; a plurality of contact elements extending from each disc to its periphery and separated at the periphery by gaps, the elements of one disc corresponding to the gaps of the other disc, the other member comprising a contact brush extending across the peripheral portions of both discs; a second member at a control point; a second pair of relatively rotatable commutating members at a control point; means to rotate one of the members of the second pair by the second motor, one member of the second pair comprising two discs insulated from each other; a plurality of contact elements extending from each disc to its periphery and separated at the periphery by gaps, the elements of one disc corresponding to the gaps in the other disc; a second contact brush extending across the peripheries of the two discs of the second pair, the brushes being arranged to be included in circuits with the motors and with a source of current; one disc of each pair having elements longer than the gaps, the adjacent disc of each pair having gaps larger than the elements, each motor being arranged to be periodically connected in a circuit with both brushes and with one large element of the first pair of the members and a small element of the second pair of the members, and alternately with the small element of the first pair of the members and with the large element of the second pair of the members, the motors being thereby rendered alternately energized and denergized thereby maintaining a step by step synchronism of their rotation; and resilient means to advance the movable member of each pair after each step of movement for rendering the deenergized motor energizable in response to the completion of the step of the movement of the second motor.

14. A synchronized control apparatus comprising a motor at a controlled point adapted to operate a useful load; a pair of rotatable commutating members at the controlled point; means to rotate one of the commutating members by the motor; one member comprising two discs insulated from each other; a plurality of contact elements extending from each disc to its periphery and separated at the periphery by gaps, the elements of one disc corresponding to the gaps of the other disc, the other member comprising a contact brush extending across the peripheral portions of both discs; a second motor at a control point; a second pair of relatively rotatable commutating members at a control point; means to rotate one of the members of the second pair by the second motor, one member of the second pair comprising two discs insulated from each other; a plurality of contact elements extending from each disc to its periphery and separated at the periphery by gaps, the elements of one disc corresponding to the gaps in the other disc; a second contact brush extending across the peripheries of the two discs of the second pair, the brushes being arranged to be included in circuits with the motors and with a source of current; one disc of each pair having elements longer than the gaps, the adjacent disc of each pair having gaps larger than the elements, each motor being arranged to be periodically connected in a circuit with both brushes and with one large element of the first pair of the members and a small element of the second pair of the members; and alternately with the small element of the first pair of the members and with the large element of the second pair of the members, the motors being thereby rendered alternately energized and deenergized thereby maintaining a step by step synchronism of their rotation; and magnetic means to positively stop each motor upon completion of each step of movement.

LEONID A. DUNAJEFF.